Patented June 5, 1951

2,555,763

UNITED STATES PATENT OFFICE 2,555,763

RECOVERY OF STREPTOMYCIN FROM NAPHTHOL BLUE-BLACK SALT

Peter P. Regna, Woodcliff, N. J., and Isaiah A. Solomons, III, Jackson Heights, and Richard Pasternack, Islip, N. Y., assignors to Chas. Pfizer & Co., Inc., Brooklyn, N. Y., a corporation of New Jersey No Drawing. Application May 24, 1947, Serial No. 750,372

4 Claims. (Cl. 260—210)

This invention relates to the recovery of streptomycin from streptomycin dye salts, and it has for its object to provide a novel and improved process for this purpose.

Another object of the invention is to provide an efficient and economical method of separating streptomycin of high antibiotic activity from streptomycin dye salts.

Still another object is to separate streptomycin of high antibiotic activity from the streptomycin-Naphthol Blue-Black (8-amino-7-p-nitrophenylazo-2-phenylazo-1-naphthol-3,6-disulfonic acid) salt which may be precipitated directly from crude aqueous solutions of streptomycin, such as fermentation broths.

Various other objects and advantages will be apparent as the nature of the invention is more fully disclosed.

Streptomycin, an antibiotic produced by fermentation from selected strains of cultures of *Streptomyces griseus*, is a highly potent antibacterial agent which is effective against a wide variety of pathogenic organisms. Clinical indications for the use of streptomycin have been observed in urinary tract infections due to gram negative microorganisms, influenza bacillus meningitis, tracheobronchitis and pneumonia, tularemia, opthalmic infections due to Ps. pyocyaneus, peritonitis due to gram negative organisms, and certain gram negative bacillary infections. Promising results have been obtained also in studies of tuberculosis.

It is known to adsorb streptomycin or its salts from solutions upon activated carbon, and to elute it therefrom with solvents adjusted to a pH below neutral, but this procedure yields streptomycin along with much extraneous material since many other substances are simultaneously adsorbed and eluted. For this reason this method gives a product of low potency. It is also possible to prepare streptomycin concentrates by adsorption on zeolite or ion-exchange resins. However, in removing the streptomycin from these adsorbents by sodium or potassium chlorides, the streptomycin becomes contaminated with considerable amounts of these salts which are difficult to remove, and even after separation of the inorganic salts gives concentrates with a low streptomycin potency.

In our copending application, Serial No. 743,456, filed April 23, 1947, now Patent No. 2,538,847, we have disclosed that streptomycin is almost quantitatively precipitated from fermentation broths, in the form of a dye salt, by combining the streptomycin in the growth medium with the disodium salt of 8-amino-7-p-nitrophenylazo-2-phenylazo-1-naphthol-3,6-disulfonic acid, a dye which is also known as Naphthol Blue-Black (Color Index #246).

Our present invention relates to a method of recovering streptomycin of high antibiotic activity from the streptomycin salt of 8-amino-7-p-nitrophenylazo-2-phenylazo-1-naphthol- 3,6 - disulfonic acid, and is based upon our discovery of a novel method of accomplishing the metathesis reaction of the said streptomycin dye salt into its two components, whereby the streptomycin-Naphthol Blue-Black salt is suspended in a mixture of aqueous dilute acid and an organic solvent, not miscible with water, which after shaking produces a soluble organic phase of the Naphthol Blue-Black and an aqueous phase containing the streptomycin.

In a preferred embodiment of the invention, this metathesis reaction is carried out by suspending the streptomycin-Naphthol Blue-Black in a mixture of equal volumes of 0.1 N sulfuric acid and a solvent, such as butyl alcohol, amyl alcohol, ethers of ethylene glycol ("cellosolves"): phenyl "cellosolve," benzyl "cellosolve," etc. Since streptomycin is somewhat unstable at this pH (see "Stability of Streptomycin" by Regna, Wasselle and Solomons, J. Biol. Chem., vol. 165, p. 631 (1946)), this procedure should be carried out with expediency. The necessary conditions for carrying out this procedure are (1) that the organic solvent is immiscible with water, (2) that the free acid of 8-amino-7-p-nitrophenylazo-2-phenylazo-1-naphthol-3,6-disulfonic acid is soluble in the organic phase, and (3) that the acidity is maintained such that the streptomycin does not combine with the Naphthol Blue-Black in the organic phase. The acidity can be maintained by an organic or inorganic acid which serves to drive the streptomycin salt into the aqueous phase. As a modification, the streptomycin-Naphthol Blue-Black dye may be dissolved in a solvent in the absence of dilute acid, if solvents such as butanol, benzyl "cellosolve," phenyl "cellosolve," etc. are used, and the resulting solution then extracted with dilute acid, as hereinafter described.

The microbiological assays hereinafter referred to were carried out using *Escherichia coli* and *Bacillus subtilis* similar to those employed for penicillin assays. The *B. subtilis* plate assay is carried out by the method of Schmidt and Moyer (J. Bact., vol. 47, p. 199 (1944)), and the *E. coli* turbidimetric assay by the procedure of McMahan (J. Biol. Chem., vol. 153, p. 249 (1944)).

Example 1

Fifty liters of a filtered streptomycin fermentation broth (150 mcg./ml.) was adjusted to pH 5.5 with sulfuric acid and to it was added 70 g. of "supercel" (a diatomaceous earth filter-aid) and 120 g. of Naphthol Blue-Black. The large amount of filter-aid is not necessary for purposes of aiding the filtration, but is a means of keeping the precipitate well-dispersed in the subsequent conversion of the streptomycin-Naphthol Blue-Black. The mixture was stirred for one-half hour, filtered and the filtrate, containing 10 mcg./ml. was discarded. The streptomycin-Naphthol Blue-Black cake was partially dried on a Buechner funnel and was then divided into a number of portions from which the streptomycin was recovered as described below, as well as in Examples 2 and 3.

Fifty grams of the wet streptomycin-Naphthol Blue-Black cake was suspended in a mixture containing 100 ml. of water and 500 ml. of wet butyl alcohol; the mixture was adjusted to pH 1 with dilute sulfuric acid and shaken. After settling, the aqueous phase and the solids were separated. The solids were removed by filtration, resuspended in 0.1 N sulfuric acid and re-extracted with fresh butyl alcohol. The aqueous phase and the solids were again drawn off, and the "supercel" was removed by filtration. The combined aqueous phases were extracted with a small amount of butyl alcohol to remove the last traces of the dye, separated and neutralized with barium hydroxide and filtered. The colorless filtrate was frozen, dried under vacuum and further dried in a vacum desiccator over barium oxide; the dried streptomycin sulfate when assayed against the Food and Drug Administration working standard gave an average potency of 550 mcg./mg. by the B. subtilis agar plate and the E. coli turbidimetric methods.

Example 2

Fifty grams of the wet streptomycin-Naphthol Blue-Black cake, obtained as described in Example 1, was dissolved in 200 ml. of wet ethylene glycol monophenyl ether. The "supercel" was removed by filtration, and the filtrate was extracted with 50 ml. of 0.1 N sulfuric acid. The aqueous phase was drawn off and the phenyl "cellosolve" was re-extracted with 40 ml. of 0.1 N sulfuric acid. After separating the layers, the aqueous phases were combined, and extracted with 50 ml. of ethylene glycol monophenyl ether to remove the last traces of the dye. The aqueous phase was drawn off, neutralized with barium hydroxide and filtered. The colorless filtrate was frozen, dried under vacuum and further dried in a vacuum desiccator over barium oxide; the dried streptomycin sulfate when assayed against the Food and Drug Administration working standard gave an average potency of 530 mcg./mg. by the B. subtilis agar plate and the E. coli turbidimetric methods.

Example 3

Fifty grams of the wet streptomycin-Naphthol Blue-Black cake, obtained as described in Example 1, was suspended in 200 ml. of wet ethylene glycol monobenzyl ether. The "supercel" was removed by filtration, and the filtrate was extracted with 50 ml. of 0.1 N hydrochloric acid. The aqueous phase was drawn off and the benzyl "cellosolve" was re-extracted with 40 ml. of 0.1 N hydrochloric acid. After separating the layers, the aqueous phases were combined, and extracted with 50 ml. of ethylene glycol monobenzyl ether to remove the last traces of the dye. The aqueous phase was drawn off, neutralized with silver oxide and the silver chloride filtered. The colorless filtrate was frozen, dried under vacuum and further dried in a vacuum desiccator over barium oxide; the dried streptomycin trihydrochloride when assayed against the Food and Drug Administration working standard gave an average potency of 560 mcg./mg. by the B. subtilis agar plate and the E. coli turbidimetric methods.

The invention claimed is:

1. A method for preparing a water-soluble streptomycin salt of high antibiotic activity, which comprises subjecting a streptomycin salt of Naphthol Blue-Black to metathesis in a liquid mixture of a dilute aqueous inorganic acid of the class consisting of hydrochloric acid and sulfuric acid, and a water-immiscible organic solvent of the class consisting of butyl alcohol, amyl alcohol and the monophenyl and monobenzyl ethers of ethylene glycol, while maintaining the acidity of the mixture within the range at which the streptomycin is relatively stable, thereby extracting the Naphthol Blue-Black in the organic phase of said mixture and forming a solution of the desired water-soluble streptomycin salt in its aqueous phase.

2. A method as claimed in claim 1, wherein the pH value of the mixture is maintained in the order of one.

3. A method as claimed in claim 1, wherein the dilute aqueous inorganic acid is sulfuric acid.

4. A method as claimed in claim 1, wherein the water-immiscible organic solvent is butyl alcohol.

PETER P. REGNA.
ISAIAH A. SOLOMONS, III.
RICHARD PASTERNACK.

REFERENCES CITED

The following references are of record in the file of this patent:

UNITED STATES PATENTS

| Number | Name | Date |
|---|---|---|
| 2,462,175 | Folkers | Feb. 22, 1949 |

OTHER REFERENCES

Perry: "Chemical Engineers' Handbook"; 2nd Edition (1941), pp. 1214–1215 (2 pages).

Kuehl et al.: Science; vol. 102 (1945), pp. 34–35 (2 pages).

Carter et al.: J. Biol. Chem.; vol. 160 (1945), p. 339 (1 page).

Peck et al.: J. A. C. S.; vol. 68 (1946), pp. 29–30 (2 pages).

Kuehl et al.: J. A. C. S.; vol. 68 (1946), pp. 1460–1462 (3 pages).